United States Patent Office
3,460,777
Patented Aug. 12, 1969

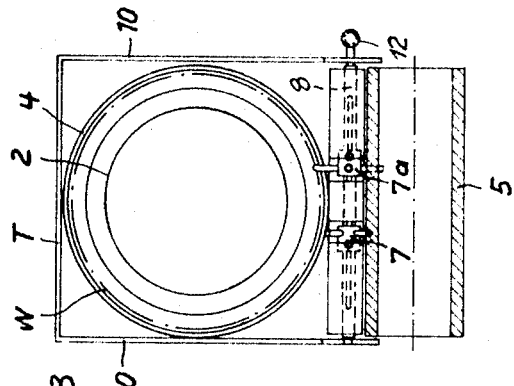
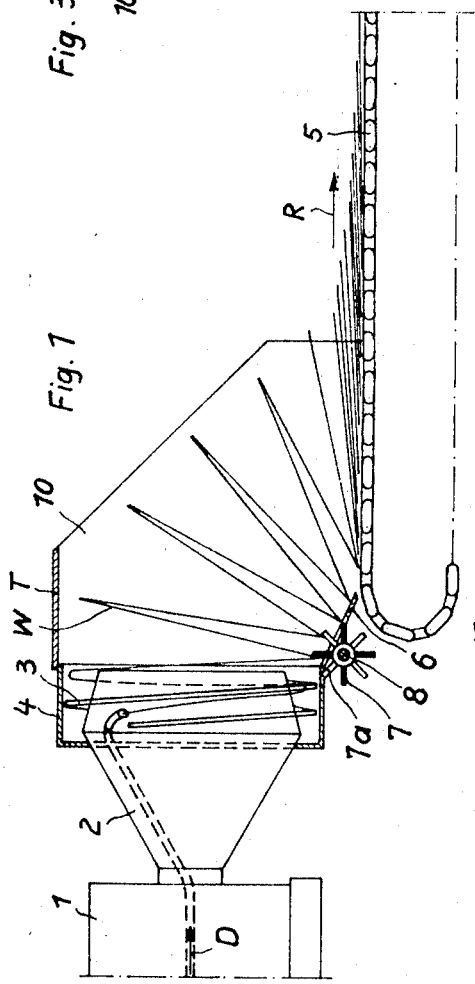
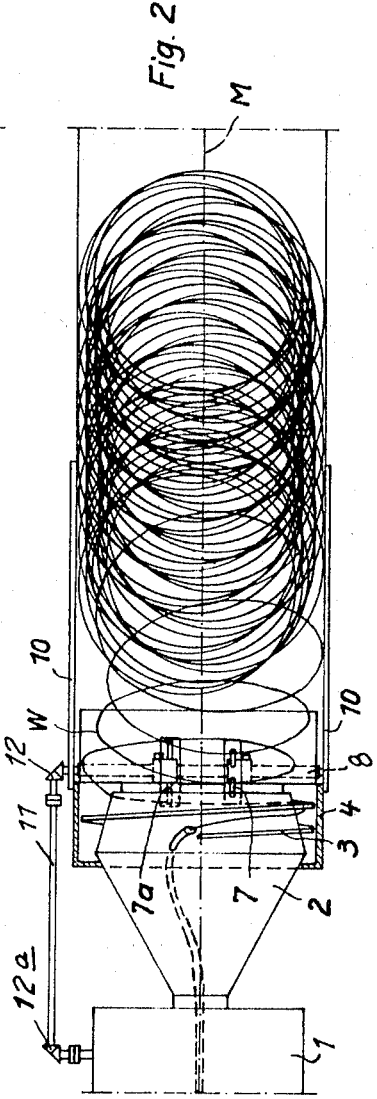

3,460,777
DEPOSITION OF A CONTINUOUS STRING OF TURNS OF WIRE UPON A CONVEYOR
Egbert Schröder, Lank, Germany, assignor to Scholemann Aktiengesellschaft, Dusseldorf, Germany, a company of Germany
Filed Jan. 31, 1968, Ser. No. 701,883
Claims priority, application Germany, Feb. 4, 1967, Sch 40,177
Int. Cl. B21c 47/00
U.S. Cl. 242—83                                     9 Claims

ABSTRACT OF THE DISCLOSURE

A method of and means for laying a continuous series of turns of wire upon a conveyor having a substantially horizontal conveyor plane, wherein turns of wire, coming from a turn-layer, are deposited over-lapping one another upon the conveyor, and a relative movement, transverse to the direction of movement of the conveyor, is imparted to the turns of wire by rotatable deflecting means applied to the foot points of the turns of wire laterally of the axis of symmetry of the conveyor, the said transverse movement being directed in each case obliquely and laterally to the direction of fall of the turns.

---

This invention relates to a method of depositing a continuous string of series of turns of wire, formed in a turn-layer and tilted down on to a following horizontally arranged conveying means constructed with a horizontal plane of conveyance, the turns of wire of the said string overlapping one another upon the conveyor. By drawing the turns of wire apart on the conveying means, particularly advantageous cooling conditions are provided, which ensure an advantageous texture for the further treatment, for instance on drawing machines. At the end of the conveyor, the individualized turns of wire are assembled into a bunch.

In the drawing apart of the turns of wire, during the lateral cutting into lengths of the string of wire turns spread out upon the conveyor, zones of the very high density of material are formed. Therefore, the desirable uniform cooling of the wire over the length of its string of turns cannot be satisfactorily attained. In the zones of material concentration an accumulation of heat is produced, whereby a slower cooling rate is effected in this region of the turns of wire.

In the recognition of these difficulties it has already been proposed to fan out the individual turns of wire beyond the turn-layer, that is to say to deposit turn after turn of wire spirally, and symmetrically in relation to the center line, upon a conveying means moving relatively to the stationary turn-layer.

If however the individual turns of wire are deposited with a constant diameter along a center line parallel to the edges of the conveyor, the outer sections of the turns, which bound the breadth of the rings towards both longitudinal edges of the conveyor, lie comparatively closely upon one another. By this proximity of material at the outer sections of turns, there occurs, along the two outer edges of the wire spiral laid out, an accumulation of heat, which results in a slower cooling rate in the region of these concentrations of material. This however, likewise results in differences of the texture of the wire over its length. A greater drawing apart of the turns, for instance by increasing the speed of the conveyor in order to obviate the superposing of the outer portions of the turns, is not desirable, because the turns would thereby receive a somewhat elliptical form, deviating too greatly from circular form, and assemblage into circular bunches would no longer be possible.

It is also known to wobble the turns, that is, to deposit them in different diameters, by varying the peripheral speed of the turn-layer. In this way, however, it is not possible to form correctly stratified bunches from the turns of different sizes.

A further suggestion has therefore been made to subject either the turn-layer or else the conveyor to a relative motion transverse to the direction of conveyance during the depositing of the turns of wire upon the conveyor, whereby an individualizing of the turns of wire can by effected in a lateral direction upon the conveying means.

It is a disadvantage of such a device that the masses to be moved, whether it be the turn-layer or the end face of the conveyor, are so great that only with a relatively slow speed of conveyance can a deflecting effect of the turns of wire be obtained upon a conveyor. The present apparatuses are, however, not suitable at rolling speeds of 50 meters per second and more, for exerting a fully effective influence upon the position of the turns.

The object of the present invention is to provide a method and a means which will effect a lateral deflection of the turns of wire upon the conveyor even at extremely high rolling speeds.

FIGURES 1, 2 and 3 of the accompanying drawings show by way of example one embodiment of the invention, in side elevation, in plan and in front elevation respectively.

In these figures, 1 to 3, 1 denotes a drive of a turn-layer, which is formed from a rotating laying cone 2, with a worm thread 3 secured thereon. In the turn-layer the rolled wire D, coming primarily from a rolling-mill train, is preformed into a string or series of turns of wire by being laid in the rotating turn-layer head with the laying cone 2 and worm thread 3. The periphery of the worm thread 3 is bounded by a cylindrical casing 4. On the outlet side a closed tunnel T of box-like construction is attached, which with lateral guiding walls 10, serves to guide the string of turns of wire round to an associated conveying means 5. The conveying means 5 is constructed as an endless chain band, the conveying plane of which extends lengthwise in a horizontal plane. The individual turns of wire W of the string of turns coming from the turn-layer are standing with their lower sections upon a chute plate 6, are braked or retarded by friction, and consequently tilt down or to the conveyor 5. Since the latter is circulating in the direction of conveyance R, the turns of wire W pass continuously on to the conveyor 5 in a series of overlapping turns.

As is further seen from the drawing, two cam wheels 7 and 7a, preferably fixed as to rotation upon a common shaft 8, one on each side of the central longitudinal axis M of the conveyor 5, and each projecting through the chute plate 6 between the turn-layer and the conveyor 5. The cam wheels 7 and 7a are moved by a common drive, that is to say, they are preferably operatively connected, by way of an articulated shaft 11 and a bevel wheel gear 12, 12a, with the turn-layer drive 1. The speed of revolution of the cam wheels 7 and 7a is thereby directly dependent upon the speed of revolution of the turn-layer.

The cam wheels 7 and 7a are arranged in staggered relationship to one another in such a way that each cam or tooth of the cam wheel 7 divides the pitch angle of the cam wheel 7a into two equal angles. The result is thereby obtained that in each case, alternately, one or more turns of wire W engage the cam of the cam wheel 7, and then the next turn or turns engage the cam of the cam wheel 7a. Since the point of application of the cams is located eccentrically in relation to the turns, a torque is imparted in each case to the turn or turns of wire W is retarded by the cam of wheel 7 or 7a in question, whereby they are deflected somewhat to the right or left and thus fall on to the conveyor 5 overlapping in a somewhat laterally displaced position. This effect is capable of being enhanced by increasing the distance of the cam wheels 7 and 7a from the center line M, but in any case the turns of wire W must still be able to engage the cams. The lateral guiding walls 10 limit in each case the deflection of the turns of wire W. The pitch of the cam wheels 7 and 7a is in each case fixed according to the rolling speed.

What I claim is:

1. A method of laying a continuous series of turns of wire upon a conveyor having an approximately horizontal conveyor plane, comprising the steps of introducing wire to a turn-layer for forming said wire into helical turns having a common longitudinal central axis, and imparting a lateral movement to the turns at their base portions by a rotationally movable deflection means between said turn-layer and said conveyor to cause the turns to laterally deviate from said central axis as they fall onto said conveyor.

2. A method as claimed in claim 1 wherein the lateral movement is alternately imparted first in one lateral direction and then in another lateral direction so that the turns on said conveyor have only small areas of overlays.

3. Apparatus for laying a continuous series of turns of wire upon an approximately horizontal conveyor plane comprising means to provide wire, a turn-layer device for forming said wire into helical turns having a common longitudinal central axis, and a rotationally movable deflection means between said turn-layer and said conveyor to impart a lateral movement to the base portions of the turns to cause them to laterally deviate from said central axis as they fall onto the conveyor.

4. Apparatus as claimed in claim 3 wherein said deflection means are two positively driven cam wheels arranged respectively on each side of said central axis, the cams of the two cam wheels are arranged in staggered relationship to one another by half a pitch angle so that the successive turns are alternately deviated in a first lateral direction then in a second lateral direction.

5. Apparatus as claimed in claim 4 wherein said two cam wheels are rotatable by a common drive.

6. Apparatus as claimed in claim 5 wherein said two cam wheels are mounted on a common shaft transverse to said central axis.

7. Apparatus as claimed in claim 6 wherein said cam wheels are longitudinally displaceable along said shaft.

8. Apparatus as claimed in claim 4 wherein said cam wheels and said turn-layer have a common drive.

9. Apparatus as claimed in claim 3 wherein lateral boundary walls define the maximum lateral movement and deviation of said turns on said conveyor.

References Cited

UNITED STATES PATENTS

| | | | |
|---|---|---|---|
| 2,954,180 | 9/1960 | Crum | 242—83 |
| 3,405,885 | 10/1968 | Schroder et al. | 242—83 |

NATHAN L. MINTZ, Primary Examiner